United States Patent
Lim

(10) Patent No.: US 10,713,586 B2
(45) Date of Patent: Jul. 14, 2020

(54) SYSTEM AND METHOD FOR HIGH SPEED THREAT INTELLIGENCE MANAGEMENT USING UNSUPERVISED MACHINE LEARNING AND PRIORITIZATION ALGORITHMS

(71) Applicant: Certis CISCO Security Pte Ltd, Singapore (SG)

(72) Inventor: Keng Leng Albert Lim, Singapore (SG)

(73) Assignee: Certis CISCO Security Pte Ltd, Singapore (SG)

(*) Notice: Subject to any disclaimer, the term of this patent is extended or adjusted under 35 U.S.C. 154(b) by 1276 days.

(21) Appl. No.: 14/891,621

(22) PCT Filed: Jul. 24, 2015

(86) PCT No.: PCT/SG2015/050233
§ 371 (c)(1),
(2) Date: Nov. 16, 2015

(87) PCT Pub. No.: WO2017/018926
PCT Pub. Date: Feb. 2, 2017

(65) Prior Publication Data
US 2017/0228658 A1    Aug. 10, 2017

(51) Int. Cl.
*G06N 20/00* (2019.01)
*G06F 21/56* (2013.01)
(Continued)

(52) U.S. Cl.
CPC ............ *G06N 20/00* (2019.01); *G06F 21/56* (2013.01); *G06K 9/6221* (2013.01);
(Continued)

(58) Field of Classification Search
CPC .............................. G06N 20/00; G06F 21/56
See application file for complete search history.

(56) References Cited

U.S. PATENT DOCUMENTS 8,813,228 B2   8/2014 Magee et al.
2003/0191832 A1  10/2003 Satyavolu et al.
(Continued)

FOREIGN PATENT DOCUMENTS

| EP | 3143547 | 3/2019 |
| WO | WO2012/170423 | 12/2012 |
| WO | WO2014/099195 | 6/2014 |

OTHER PUBLICATIONS

Siraj, Moheyzah Md, Mohd Aizaini Maarof, and Siti ZM Hashim. "Intelligent alert clustering model for network intrusion analysis." Int. J. Advance. Soft Comput. Appl 1.1 (2009): 1-16. (Year: 2009).*

(Continued)

*Primary Examiner* — Vincent Gonzales
*Assistant Examiner* — Kevin W Figueroa
(74) *Attorney, Agent, or Firm* — BakerHostetler

(57) ABSTRACT

This document discloses a system and method for consolidating threat intelligence data for a computer and its related networks. Massive volumes of raw threat intelligence data are collected from a plurality of sources and are partitioned into a common format for cluster analysis whereby the clustering of the data is done using unsupervised machine learning algorithms. The resulting organized threat intelligence data subsequently undergoes a weighted asset based threat severity level correlation process. All the intermediary network vulnerabilities of a particular computer network are utilized as the critical consolidation parameters of this process. The final processed intelligence data gathered through this high speed automated process is then formatted into predefined formats prior to transmission to third parties.

30 Claims, 7 Drawing Sheets

| Item ID | Source | Type of Malicious Activity | Data |
|---|---|---|---|
| 1 | open A | worm | $d_{win,email}$ |
| 2 | commercial | Trojan | $d_{win,email}$ |
| 3 | community | rootkits | $d_{linux,TCP}$ |
| 4 | anonymous | DoS | $d_{linux,fax}$ |
| 5 | commercial | worm | $d_{win,SSH}$ |
| 6 | commercial | DoS | $d_{linux,PPP}$ |
| 7 | open B | worm | $d_{win,HTTP}$ |
| 8 | open B | Trojan | $d_{win,email}$ |
| 9 | open A | rootkits | $d_{win,TCP}$ |
| 10 | community | rootkits | $d_{linux,TCP}$ |
| 11 | anonymous | worm | $d_{linux,HTTP}$ |

(51) Int. Cl.
*H04L 29/06* (2006.01)
*G06K 9/62* (2006.01)

(52) U.S. Cl.
CPC ............ *G06K 9/6276* (2013.01); *H04L 63/14* (2013.01); *H04L 63/1425* (2013.01); *H04L 63/1433* (2013.01); *H04L 63/20* (2013.01)

(56) References Cited

U.S. PATENT DOCUMENTS

| | | |
|---|---|---|
| 2007/0289013 A1 | 12/2007 | Lim |
| 2010/0115618 A1 | 5/2010 | Lee et al. |
| 2011/0219445 A1 | 9/2011 | Van Der Merwe et al. |
| 2014/0007238 A1* | 1/2014 | Magee .................. G06F 21/577 726/24 |
| 2014/0201836 A1 | 7/2014 | Amsler et al. |
| 2014/0366132 A1 | 12/2014 | Stiansen et al. |
| 2015/0172321 A1 | 6/2015 | Kirti et al. |
| 2016/0248805 A1* | 8/2016 | Burns .................. H04L 63/1408 |

OTHER PUBLICATIONS

Decision to Grant for EP Application No. 15788313.3, dated Feb. 21, 2019, 2 pp.
International Search Report for International Application No. PCT/SG2015/050233, Search completed Sep. 21, 2015, dated Sep. 21, 2015, 4 Pgs.
Petrovic, et al., "Labelling Clusters in an Intrusion Detection System Using a Combination of Clustering Evaluation Techniques", Proceedings of the 39th Hawaii International Conference on System Sciences, 2006.
Bharti, et al. "Intrusion Detection Using Clustering", Special Issue of IJCCT vol. 1 Issue 2, 3, 4; 2010 for International Conference [ACCTA-2010], Aug. 3-5, 2010, pp. 158-165.
Extended European Search Report from EPO dated Sep. 7, 2017 for relating European Application No. 15788313.3.

* cited by examiner

| Item ID | Source | Type of Malicious Activity | Data |
|---|---|---|---|
| 1 | open A | worm | $d_{win,email}$ |
| 2 | commercial | Trojan | $d_{win,email}$ |
| 3 | community | rootkits | $d_{linux,TCP}$ |
| 4 | anonymous | DoS | $d_{linux,fax}$ |
| 5 | commercial | worm | $d_{win,SSH}$ |
| 6 | commercial | DoS | $d_{linux,PPP}$ |
| 7 | open B | worm | $d_{win,HTTP}$ |
| 8 | open B | Trojan | $d_{win,email}$ |
| 9 | open A | rootkits | $d_{win,TCP}$ |
| 10 | community | rootkits | $d_{linux,TCP}$ |
| 11 | anonymous | worm | $d_{linux,HTTP}$ |

FIGURE 2

| Item ID | Source | Type of Malicious Activity | Data |
|---|---|---|---|
| 1 | open A | worm | $d_{win,email}$ |
| 5 | commercial | worm | $d_{win,SSH}$ |
| 7 | open B | worm | $d_{win,HTTP}$ |
| 11 | anonymous | worm | $d_{linux,HTTP}$ |
| 2 | commercial | Trojan | $d_{win,email}$ |
| 8 | open B | Trojan | $d_{win,email}$ |
| 3 | community | rootkits | $d_{linux,TCP}$ |
| 9 | open A | rootkits | $d_{win,TCP}$ |
| 10 | community | rootkits | $d_{linux,TCP}$ |
| 6 | commercial | DoS | $d_{linux,PPP}$ |
| 4 | anonymous | DoS | $d_{linux,fax}$ |

FIGURE 3

| Item ID | Source | Type of Malicious Activity | Data |
|---|---|---|---|
| 1 | open A | worm | $d_{win,email}$ |
| 5 | commercial | worm | $d_{win,SSH}$ |
| 7 | open B | worm | $d_{win,HTTP}$ |
| 11 | anonymous | worm | $d_{linux,HTTP}$ |
| 2 | commercial | Trojan | $d_{win,email}$ |
| 8 | open B | Trojan | $d_{win,email}$ |
| 6 | commercial | DoS | $d_{linux,PPP}$ |
| 4 | anonymous | DoS | $d_{linux,fax}$ |

FIGURE 4

SYSTEM AND METHOD FOR HIGH SPEED THREAT INTELLIGENCE MANAGEMENT USING UNSUPERVISED MACHINE LEARNING AND PRIORITIZATION ALGORITHMS

FIELD OF THE INVENTION

This invention relates to a system and method for consolidating threat intelligence data for a computer and its related networks. In particular, the invention involves collecting massive volumes of raw threat intelligence data from a plurality of sources and partitioning the collected data into a common format for cluster analysis. The normalised data is then clustered using unsupervised machine learning algorithms. The resulting organized threat intelligence data subsequently undergoes a weighted asset based threat severity level correlation process. All the intermediary network vulnerabilities of a particular computer network are utilized as the critical consolidation parameters of this process. The final processed intelligence data gathered through this high speed automated process is then formatted into predefined formats prior to transmission to third parties.

SUMMARY OF PRIOR ART

The security and well-being of computers and their related networks have become quintessential to the normal operation of everyday businesses as information stored within such computers and networks are threatened on a daily basis by increasingly sophisticated malicious cyber-threats from a wide variety of sources. Due to the advancements in computing technology, attacks on computer networks have also become increasingly sophisticated, making it difficult for existing security professionals and their management tools to respond to and to mitigate these attacks. These cyber-attacks may be in the form of threats from computer viruses, worms, denial of service attacks (DoS), Trojan horses, phishing, or any other malicious software whose intent is to disrupt basic computer operations, gather sensitive data and/or gain access to restricted computer networks. Software of such nature is generalized as "malware". Hence, maintaining constant situational awareness of the latest intelligence information about these cyber security threats is required to pre-empt any damage that may be caused by these threats to important information assets.

To mitigate cyber threats posed to computers and its related network, security providers require detailed information about the profile and source of the threats. This information would include the source of a particular malware, such as the domain name, the internet protocol (IP) address, related websites and their Universal Resource Locator (URL), email addresses, countries and global position coordinates, together with the detection footprint of these malwares so that network security providers are able to come up with a comprehensive strategy to anticipate and mitigate these malwares.

As it is not possible for network security providers to acquire such information on their own, such information is typically obtained from various intelligence sources such as open sources and commercial vendors. These intelligence sources supply cyber-threat intelligence data which provide information about potential and existing cyber-threats that have been detected, identified and categorized. The data obtained from these information providers may be then utilized by network security providers and system administrators to ensure that their computer systems are well protected against these potential threats.

Most system administrators subscribe to both open sources and commercial network security providers for these threat intelligence data. However, data feeds from each of these sources usually are in their own proprietary formats, and depending upon the strength of the research and development team, also comes with varying degrees of validation and reliability. The possibility of the communication of erroneous, inaccurate, and/or misleading information is of particular concern as this disinformation may cause widespread doubt in the ability of an organisation or government that utilizes the received threat intelligence. This disinformation issue is not easily dealt with as digital transmission of information happens at very high speed, freely and in massive volumes. As a result, it is difficult for network administrators to correctly adopt these incongruent data feeds into useable actionable responses against oncoming security threats.

Furthermore, as massive volumes of raw data are produced by various intelligence sources daily, it is a daunting feat to distil actionable information from this sheer volume of raw data, which may even possibly contain replicated data. This problem becomes further convoluted when each intelligence source communicates data in its own language with its own rules, using its own network protocols and event logs. This results in the transmission of various formats of data using various network protocols which vary from one source to the next. In view of this, most providers of network security threat intelligence systems would be overwhelmed and their overall vision of cyber-security threat intelligence postures would be lacking, delayed and confused. As such, it is a great challenge to effectively cut through the sheer amount of raw threat intelligence data in different formats and transform them into useful intelligence data. The accumulation of these human and technology inefficiencies will result in the transmission of data that will be under-utilized by third parties.

U.S. Pat. No. 8,813,228 B2 titled "Collective Threat Intelligence Gathering System" in the name of Deloitte Development LLC proposes a system that collects threat intelligence data from a variety of sources. The system then aggregates, normalize, filters, scores and categorize the data to identify threats to an information network. This document also discloses that ultimately, each feed of incoming intelligence data is categorized into predefined threat categories. The data is also analysed and scored using commercial or publicly available data of known threats. Data that receives a high maliciousness score is then further formatted before being distributed to consumers.

United States Publication No. 2003/0191832 A1 titled "Method and Apparatus for Controlled Establishment of a Turnkey System Providing a Centralized Data Aggregation and Summary Capability to Third Party Entities" in the name of Ramakrishna Satyavolu et al. discloses a software system for collecting and aggregating data from a network whereby the data is then compartmentalized, optimized and summarized before the processed data is distributed to third parties. Third parties harness the intelligence created from the system to provide and improve their security systems.

In general, data feeds obtained from various sources do not provide instant and automated threat intelligence analysis. In particular, there are no sources of cyber-threat data that provide "intelligent" data feeds that assess the accuracy and relevancy of the data towards the targeted computer systems. All the data obtained would still have to go through the lengthy and time consuming process of being analysed by a human analyst before any sense may be made of the data. Furthermore, although threat data may be analysed and scored, such data may not be relevant to a particular network and as such, a computer network may still be swamped or overloaded with malicious data that achieved a high threat score.

For the above reasons, those skilled in the art are constantly striving to come up with a system and method that is capable of gathering and aggregating large volumes of raw cyber-threat intelligence data from a plurality of sources via a plurality of network protocols and converting the raw data into a useable format prior to redistribution to interested third parties.

SUMMARY OF THE INVENTION

The above and other problems are solved and an advance in the art is made by systems and methods provided by embodiments in accordance with the invention. A first advantage of embodiments of systems and methods in accordance with the invention is that threat intelligence data may be collected from a large number of intelligence generating sources in an efficient manner, and regardless of the format of the data or network protocol used for the collection of the data, only data relevant to a target computer network under surveillance is formatted into the computer network's predefined format.

A second advantage of embodiments of systems and methods in accordance with the invention is that threat intelligence data from many sources can be effectively and efficiently aggregated in a high speed manner and can immediately be put to use defending a particular computer network from anticipated cyber-attacks as highlighted in the received threat intelligence data.

A third advantage of embodiments of systems and methods in accordance with the invention is that only threat intelligence information that has been validated and is relevant to the computer network is formatted into the computer network's predefined format. Such data is extremely useful to the computer network's security team as this greatly reduces the amount of data that the security analyst has to go through.

A fourth advantage of embodiments of systems and methods in accordance with the invention is that for the formation of the clusters, unsupervised machine learning algorithm is utilized thereby negating the need for external assistance through the adopted network training period. This cluster analytics methodology will group known and unknown threats into cluster maps where unknown security threats will also be detected as cluster analysis allows for unknown malicious threats or anomalies to be identified in the map without the limitation of having predefined classifications. Post clustering analytics are also applied whereby the clustered data further undergoes weighted severity analysis and vulnerability correlation analysis to ensure that only relevant and accurate data are provided to a particular computer network.

The above advantages are provided by embodiments of a method in accordance with the invention operating in the following manner.

According to a first aspect of the invention, a method of consolidating threat intelligence data for a computer network is provided where the method is to be performed by a computer system comprises the steps of collecting threat intelligence data from a plurality of sources and normalising the collected threat intelligence data into a common/uniform data format, grouping normalised threat intelligence data into clusters using unsupervised machine learning algorithms, wherein each cluster comprises a group of data that represents an attribute of the threat intelligence data, categorizing the clusters for computer security threats severe to the computer network, comparing the clusters categorized as severe with a security posture of the computer network to determine clusters of interest to the computer system, and formatting the clusters determined to be of interest to the computer system to a predefined format of the computer network.

With reference to the first aspect, in a first possible implementation of the first aspect, the categorizing of the clusters that are severe to the computer network comprises the steps of retrieving a list of computer assets associated with the computer network, and identifying clusters that affect a computing feature of the computer assets as clusters that have computer security threats severe to the computer network.

With reference to the first possible implementation manner of the first aspect, the manner further comprises retrieving severity weightage values accorded to each of the computer assets associated with the computer network; summing the retrieved severity weightage values; and allocating the summed severity weightage value to the computer network.

With reference to the first possible implementation manner of the first aspect, the computing feature comprises an operating system of a computer asset or a network protocol provided by the computer asset.

With reference to the first aspect, in a second possible implementation of the first aspect, wherein before the comparing the clusters categorized as severe with a security posture of the computer network to determine clusters of interest to the computer system, the method further comprises generating the security posture of the computer network.

With reference to the second possible implementation manner of the first aspect, in a fourth possible implementation manner of the first aspect, the generating the security posture of the computer network comprises creating an object model representing the computer network, wherein the object model includes computer security information of computer assets contained within the computer network, and executing an analysis program operative to run vulnerability testing of each of the computer assets in the computer network using the object model, wherein the results or the vulnerability testing are used to determine the security posture of the computer network.

With reference to the fourth possible implementation manner of the first aspect, in a fifth possible implementation manner of the first aspect, the vulnerability testing of each of the computer assets in the computer network using the object model comprises tests pertaining to system level and topology vulnerabilities of the computer network, and node level vulnerabilities of the computer assets.

With reference to the first aspect, in a sixth possible implementation of the first aspect, the grouping the normalised threat intelligence data into clusters, wherein each cluster comprises a group of data that represents an attribute of the threat intelligence data further comprises validating the clusters using threat intelligence data in each cluster.

With reference to the sixth possible implementation of the first aspect, in a seventh possible implementation of the first aspect, the validating the clusters comprises assigning weightage values to each record contained in the clusters, wherein a record originating from an open source is assigned a lower weightage value as compared to a weightage value assigned to a record originating from a commercial source; summing the weightage values of records contained in each cluster; and validating clusters that have summed weightage values that exceed a predefined threshold.

With reference to the first aspect, in an eighth possible implementation of the first aspect, the formatted clusters are used to update the security posture of the computer network.

With reference to the first aspect, in a ninth possible implementation of the first aspect, the attribute of the threat intelligence data comprises a computer security threat or an Internet Protocol (IP) address.

BRIEF DESCRIPTION OF THE DRAWINGS

The above and other problems are solved by features and advantages of a system and method in accordance with the present invention described in the detailed description and shown in the following drawings.

FIG. 2 illustrating a sample of a database of as transportable incident format (TIF) records in accordance with embodiments of the invention.

FIG. 3 illustrating a sample of database of transportable incident format (TIF) records of FIG. 2 wherein the TIF records are grouped using a clustering algorithm in accordance with embodiments of the invention;

FIG. 4 illustrating a sample of the clustered database of FIG. 3 wherein a validation step has been applied in accordance with embodiments of the invention;

DETAILED DESCRIPTION

This invention relates to a system and method for consolidating threat intelligence data for a computer and its related networks. In particular, the invention involves collecting massive volumes of raw threat intelligence data from a plurality of sources and partitioning the collected data into a common transportable incident format for cluster analysis. The normalised data is then clustered using unsupervised machine learning algorithms. The resulting organized threat intelligence data subsequently undergoes a weighted asset based threat severity level correlation process. All the intermediary network vulnerabilities of a particular computer network are utilized as the critical consolidation parameters of this process. The final processed intelligence data gathered through this high speed automated process is then formatted into predefined formats prior to transmission to third parties.

Figure 1:
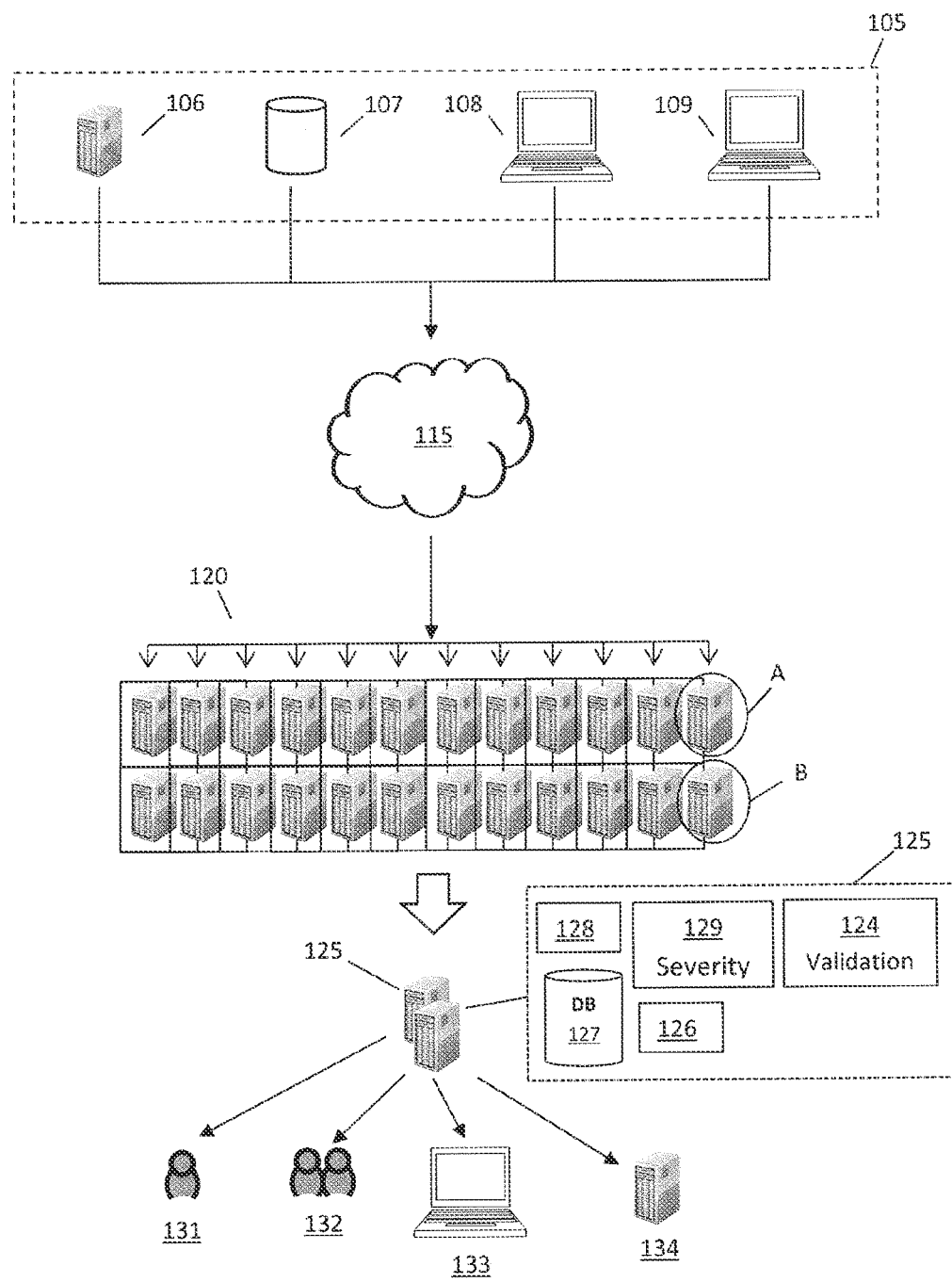
FIG. 1 illustrating a network diagram of a system for aggregating and redistributing relevant threat intelligence data in an appropriate format in accordance with embodiments of the invention.

FIG. 1 illustrates a network diagram of a system in accordance with embodiments of the invention. This system includes various modules and devices that execute processes to provide a method and system for aggregating and redistributing relevant threat intelligence data collected from source 105. The authenticated data is then formatted into predefined formats within collection engine 120 and passed to processing engine 125 for further processing before the processed data is redistributed to computer networks 131-134 accordingly.

When a computer network, e.g. one of computer networks 131-134, is newly added to the system, a list of the newly added computer network's assets, i.e. computer assets, will be provided to, and stored within processing engine 125. This list of the computer network's assets will include all assets within the computer network that are determined to be sensitive to cyber-attacks including, but are not limited to, desktops, mainframes, fax machines, routers, servers, switches, personal computers, laptops, tablets, and any device or component that supports information-related activities.

In accordance with embodiments of the invention, assets contained in the list of the computer network's assets may be allocated specific severity weightages whereby assets that are of higher importance to the computer network will be assigned a higher weightage as compared to other assets that are of a relatively lower importance to the computer network. This means that the severity weightage of assets within a computer network are not solely limited to the default severity weightages that are hardcoded or pre-allocated for specific types of computer hardware by their manufacturers. For example, by default, a desktop computer may be allocated a higher severity weightage value by the manufacturer as compared to the severity weightage value allocated to a fax machine. However, to the administrator of the computer network, it may be more important for the normal functioning of the computer network if the fax machine remains operational as compared to the desktop computer. As such, in contrast with the default or standard assignment of severity weightage values, the administrator would in actual fact assign a higher severity weightage value to the fax machine as compared to the desktop computer.

In other words, the severity weightage of assets within the computer network may be tailored according to the importance of the asset to the day-to-day operation of the computer network. Simply put, this means that the list of the computer network's assets may be tailored and customized to cover all assets in the network that are deemed to be important. This list of the computer network's computer assets that are stored within processing engine 125 will then be updated periodically so that any changes that are made to the computer networks will be adequately captured by the system. In embodiments of the invention, the list of a particular computer network's computer assets will be updated by the computer network whenever computer assets are removed from or added to the computer network.

As for processing engine 125, this device comprises modules such as database 127, clustering module 128, severity-categorizing module 129, vulnerability filtering module 126 and validation module 124. The functions of each of these modules will be described in greater detail in the following sections below.

Source 105 includes cyber threat/security intelligence sources such as open source 106, commercial provider 107, community source 108 and anonymous collector 109. Open source 106 may include, but are not limited to, publically accessible websites or domains that list and track various types of malwares or cyber-threats. These websites may be accessed by interested parties to download or obtain threat intelligence data without paying a fee. The downside is although open source 106 may provide a trove of threat intelligence data, the veracity of data obtained from open source 106 may be questionable as most of the time, data listed on open source 106 are not authenticated. Due to the nature of open source 106, open source 106 may potentially be utilized by malicious parties to distribute misinformation. As such, information obtained from open source 106 would have to be correlated with other sources to verify the accuracy of the obtained data before the data may be utilized. Some examples of such open sources include, but are not limited to websites such as "www.malwaredomainlist.com" or "www.malware-domains.com" which lists out the various cyber-threats and malwares that are propagating in cyberspace or various open source projects such as "Project Honeypot", "ZeuS Tracker", "Malware Domain List", "TOR Nodes", "Someonewhocares", and "SecurityTracker".

Commercial provider 107, may include, but are not limited to commercial cyber-threat collectors such as "McAfee", "FireEye", "Anubisnetworks", "Trend Micro", "Fortinet", "Norse" or any other such entities that provide threat intelligence data for a fee. These commercial providers typically provide threat intelligence data in their own format and via their own proprietary network protocols. Threat intelligence data obtained from these commercial providers are typically more reliable as it is in their interest to ensure that their reputation is not jeopardized by false positives. In other words, the number of positive threats or malware identified by these commercial providers typically far exceeds the number of false positives. As such, data obtained from these sources are usually more credible and are more trustworthy as compared to data obtained from other alternative sources.

Community source 108 may include online communities or networks that utilize the active participation of users in communities that engage in the collection of threat intelligence data. These communities may comprise social networks, chat rooms, online societies, or any other such suitable mediums found on the internet. As for anonymous collector 109, such a source would typically include a large variety of anonymous sources such as gateways, routers, modems, firewalls or switches that are configured to collect and transmit threat intelligence data to a centralized collection database. These anonymous collectors may also include automated feedback from users of computer networks who had experienced cyber-attacks in the past or who are presently under attack. Information obtained from community source 108 and anonymous collector 109 would also have to be correlated with other sources to verify the accuracy of the obtained data before the data may be utilized as malicious users could easily utilize these data collection feeds to inject misinformation to waylay others.

It should also be noted that data received from each source would be in the source's own format. For example, threat intelligence data obtained from "McAfee", i.e. from a source of commercial provider 107, would be in McAfee's proprietary format while data obtained from "Project Honeypot", i.e. from a source of open source 106, would be in another format unique to this particular open source.

In addition to the above, depending on the source of the threat intelligence data, the data may be transmitted from source 105 to collection engine 120 through network 115 using a variety of network protocols. Amongst the network protocols that may be utilized include, but are not limited to, Transmission Control Protocol (TCP/IP), Secure Shell (SSH), File Transfer Protocol (FTP), Simple Mail Transfer Protocol (SMTP), Telephone Network (Telnet), Hyper Text Coffee Pot Control Protocol (HTCPCP). Hyper Text Transfer Protocol (HTTP), Point to Point Protocol (PPP), Internet Message Access Protocol (IMAP), and any other proprietary network protocols that may be utilized by any one of the intelligence providers in source 105.

As for network 115, network 115 is a communications network, such as the Internet, that allows computing devices and/or processing systems to communicate with one another either through wired means, wireless means or a combination of both. One skilled in the art will recognize that wired means may include, but are not limited to, a wired network such as a wide area network (WAN) or a local area network (LAN), while wireless means may include wireless communications established via Radio Frequency (RF) signals, or infrared signals.

In accordance with embodiments of the invention, collection engine 120 comprises a plurality of computer servers that are all connected in parallel via a backbone network. Each of these servers is programmed to establish and maintain a connection with an allocated source within source 105. In other words, this means that each server in collection engine 120 will be allocated to a fixed source and the data transfer may take place using the allocated source's preferred network protocol. This ensures that threat intelligence data collected from each source takes place effectively and efficiently.

For example, computer server "A" in collection engine 120 may be tasked to collect data from a source within commercial provider 107, e.g. from McAfee's website using McAfee's propriety network protocols and in McAfee's data format, while computer server "B" may be tasked to collect data from another source within commercial provider 107, e.g. Trend Micro's website using Trend Micro's network protocol and in Trend Micro's data format. Hereinafter, when reference is made to raw threat intelligence data, one skilled in the art will understand that the data will be in a specific's source's propriety format and is configured to be transmitted using the specific source's preferred network protocol.

Furthermore, each server may execute a plurality of virtual machine emulations so that the resources of each server may be partitioned into a plurality of isolated virtual instances to facilitate data collection from a particular source via multiple channels. In embodiments of the invention, this may be implemented using peer-to-peer models. As a plurality of virtual connections are established between a server and its source of threat intelligence data, this means that if a connection is dropped between the server and the source, the transfer of threat intelligence data will not be jeopardized as the other connections may temporarily cover the dropped connection until the connection is recovered. For example, a server can have twenty isolated virtual instances to facilitate data collection via twenty channels from a particular source in open source 106. Further, although collection engine 120 in FIG. 1 illustrates only twenty four computer servers, one skilled in the art will recognize that any number of computer servers may be utilized as required without departing from this invention.

It should be noted that collection engine 120 may be programmed to periodically download the raw threat intelligence data from source 105. e.g. hourly, daily, etc. Alternatively, instructions may be provided to source 105 such that threat intelligence data may be pushed from source 105 to collection engine 120 whenever new data is made available at any particular source, i.e. using a push-mechanism.

To recap, raw data collected from a specific source will be in the source's own propriety data format and will be configured in such a manner so that it may be transmitted using the specific source's preferred network protocol. As such, collection engine 120 will have a store of threat intelligence data that exists in a variety of data formats and adapted for transmission in a variety of network protocols. In order to homogenize this mixture of information into something useable, the raw data has to be parsed and normalised into a common format. To address this problem, each server within collection engine 120 is provided with a decoder module for parsing and normalising the raw threat intelligence data collected from a specific source. Some examples of decoders related to open and commercial sources include, but are not limited to, a Honeypot decoder for parsing the list of malicious IPs provided by the Project Honeypot; a ZeuS Tracker decoder for parsing the list of ZeuS commands & controls and fake URLs provided by the ZeuS Tracker, a Malware Domain List decoder for parsing the list of malicious IPs and URLs provided by the Malware Domain List; a TOR Node decoder for parsing the list of TOR nodes provided by dan.me.uk; a Anublis Cyberfeed decoder for parsing the commercial cyber thread feeds from Anubisnetworks; a Host File decoder for parsing the list of domains that fall under the categories such as shock site, hijack site, spyware, malware, etc.

During the parsing and normalization processes at a single server, raw threat intelligence data collected from a specific source is converted from its original format, as obtained from its source, into a uniform format. In accordance with embodiments of the invention, the uniform format may be referred to as transportable incident format (TIF) records. The TIF records from the servers in collection engine 120 may then be stored in database 127, as provided in processing engine 125. This means that each data item obtained from a particular source would be parsed and normalised into a TIF record. All the TIF records obtained from each server would contain attributes that are particularly useful to a computer network's security analyst. These attributes include the SOURCE, CATEGORY and DATA attributes of a perceived computer threat as obtained from the parsing and normalization of the raw threat intelligence data (as obtained from a source specific to the server).

The attributes contained in the TIF records may also include other discrete attributes such as, but are not limited to, PROTOCOL, DESTINATION PORT, DESCRIPTION, etc. One skilled in the art will recognize that in addition to the SOURCE, CATEGORY and DATA attributes, any other combinations of the other attributes may be included in the TIF records without departing from the invention.

As the raw threat intelligence data in each of the servers in collection engine 120 are parsed and normalised, the resulting TIF records from each server are collated within database 127. Database 127 would then have a huge trove of collated threat intelligence information in the form of TIF records after all the raw threat intelligence data collected from source 105 have been parsed and normalised in collection engine 120.

A simplified example of raw threat intelligence data that has been parsed and normalised into TIF records by the decoder modules and transmitted to database 127 is illustrated in FIG. 2. The column identifier 210 in TIF records 205 represents identifiers that are used for differentiating one record from the next while each record is represented by a row in TIF records 205. FIG. 2 illustrates sample TIF records 205 that include the following attributes: source 215, category 220 and data 225. One skilled in the art will recognize that other types of alphanumerical identifiers may be used in place of the numerical identifiers shown in FIG. 2 and that any additional combination of other attributes, e.g. IP address, location, etc., may be included in the TIF records without departing from the invention. The origin or the vendor of a particular record is set out under source 215 while for this embodiment of the invention, the type of malicious activity associated with a particular record is set out under category 220. In this embodiment of the invention, data 225 includes information about any computing features that may be affected by a particular type of malicious activity. In this example, $d_{win}$ represents a Windows operating system; while $d_{email}$ represents an asset configured to send/receive emails and so on. One skilled in the art will recognize that other naming conventions may be used to represent the computing features in data 225 without departing from this invention. For example, for item number 1 in the TIF records, data 225 indicates that the type of malicious activity is a "worm" and this "worm" will affect Windows machines via an email network protocol, i.e. "$d_{win,email}$". One skilled in the art will recognize that data 225 may include other types of computing features without departing from this invention and that the example illustrated in FIG. 2 is not meant to be an exhaustive list of all the computing features.

Returning to FIG. 1, processing engine 125 is then configured to utilize clustering module 128 to cluster together items from the TIF records whereby each cluster comprises a group of data that represent an attribute of the TIF records. In this embodiment of the invention, clustering module 126 is configured to cluster together items from the TIF records with malicious activities or computer security threats that have the same intention or purpose. For example, clustering module 128 may be configured to detect from the TIF records, records that comprise computer security threats such as a virus, a Trojan, a worm, a Denial of Service attack (DoS) and so on. The clustering module will then group the detected records into clusters based on the detected malicious activities associated with the records. In other examples of the invention, clustering module 128 may be configured to detect from the TIF records, records that have the same IP address, time, country, etc. Similarly, the clustering module will then group these detected records into clusters accordingly.

Machine learning algorithms that may be used by processing engine 125 to form the clusters using pattern discovery methods include, but are not limited to, exclusive clustering, overlapping clustering, hierarchical clustering, probabilistic clustering, and two-way clustering. Since each clustering algorithm is designed with a certain type of dataset in mind, there is no single ideal clustering algorithm that will be suitable to handle all kinds of datasets. It is advantageous to utilize a clustering methodology instead of a categorization methodology as clustering allows for unknown malicious activity or security threats to be detected through the formation of the different clusters without the limitation of having predefined classifications.

In accordance with embodiments of the invention, it is preferred that unsupervised machine learning algorithms be utilized for the clustering of the TIF records. In an embodiment of the invention, the clustering module may utilize an unsupervised machine learning algorithm such as a k-nearest neighbour (k-NN) algorithm to form the clusters. The k-NN algorithm is an algorithm that stores all available examples and classifies new data based on a similarity measure of the available examples. The k-NN algorithm allows data or records to be separated based on the assumed similarities between various classes. As such, the classes may be differentiated from one another by searching for similarities between the data provided. A new record is then classified according to the class that the majority belongs to.

In accordance with other embodiments of the invention, the clustering module may utilize another type of unsupervised machine learning algorithm such as a Self-Organizing Feature Maps (SOFM or SOM) network to form the clusters. The SOM network allows for the classification of data without supervision. In particular, the SOM is a type of unsupervised artificial neural network that is trained using competitive learning to produce a relatively low-dimensional discretized representation of the input space of training samples, called a map. SOMs are different from other artificial neural networks in the sense that they use a neighbourhood function to preserve the topological properties of the input space. This makes SOMs useful for visualizing relatively low-dimensional views of relatively high-dimensional data, akin to multidimensional scaling.

A self-organizing map consists of components called neurons also known as nodes. Associated with each node is a weight vector of the same dimension as the input data vectors and a position in the map space. The usual arrangement of nodes is a regular spacing in a hexagonal or rectangular grid. The SOM describes a mapping from a relatively higher dimensional data space to a relatively lower dimensional map space. The procedure for placing a vector from the data space onto the map is to first find the node with the closest weight vector to the vector taken from the data space. Once the closest node is located, it is assigned the values from the vector taken from the data space, and this node is also called a "winner-neuron". All the neurons within the winner's radius, defined by the neighbourhood function, will update their weights as well. This method of training is called a "winner-takes-all" strategy. The advantage of SOM is that unlike supervised training techniques, the network in the SOM learns to form their own classifications of the training data without external help.

In this embodiment of the invention, before the output of clustering module 128, which is configured to run the SOM algorithm, may be utilized, the TIF records in database 127 are first provided to clustering module 128 for a period of time, i.e. between 1-4 weeks, so that clustering module 128 may be trained to identify clusters from the existing TIF records. During the training of the SOM in clustering module 128, the correlation rules between the nodes in the SOM will be refined so that when the SOM is applied to new TIF records, the TIF records may be clustered in an efficient and effective manner without requiring any external assistance.

As such, in accordance with embodiments of the invention, clustering module 128 may be configured to utilize unsupervised machine learning algorithms such as k-NN or SOM to cluster items in the TIF records according to their IP addresses, ports, incident types, types of malicious activities/computer security threats, etc. An example of TIF records 205 that have been clustered is illustrated in FIG. 3. Clustered TIF records 300 illustrate clusters that have been grouped according to a particular type of malicious activity that the group of records are clustered under. In this example, cluster 305 represents records whose malicious activity or computer security threat appears to be a worm while cluster 310 represents records whose malicious activity appears to be a Trojan. As for cluster 315, this cluster represents records whose malicious activity appears to be rootkits and cluster 320 represents records whose malicious activity appears to be DoS attacks. One skilled in the art will recognize that the TIF records be clustered into groups of data that each represents an attribute of the threat intelligence data and is not limited to only types of malicious activities as illustrated in FIGS. 2-4.

With reference to FIG. 1, the clustered records in database 127 then undergo a severity level categorizing process using severity categorizing module 129 as provided within processing engine 125. This process aims to correlate computer networks with clusters that are relevant to them. This process utilizes all the intermediary network vulnerabilities of a particular computer network as the critical consolidation parameters of the process.

In summary, the function of the severity categorizing process is to identify, for each cluster, the computer networks that may be affected by the attribute that the cluster represents. In this embodiment of the invention, the severity categorizing process identifies for each cluster, the computer networks that may be affected by the malicious activity that the cluster represents. For example, a first cluster of the clustered records may represent malicious activity that is relevant to computer network 131 and 134 but not to computer networks 132 or 133. This means that information about this cluster should only be sent to the analysts of computer networks 131, 134 and not to the analysts of computer networks 132,133. By applying this severity categorizing process, this greatly increases the relevancy and the accuracy of the threat intelligence data that is sent to a particular computer network. This prevents the computer analyst of a computer network from being swamped with irrelevant data that is useless to the computer network under their management.

In accordance with embodiments of the invention, an illustrative example of the operation of the severity categorizing process is described with reference to the example shown in FIG. 3. To recap, FIG. 3 illustrates TIF records 300 that have been clustered into clusters 305, 310, 315 and 320. In this example, severity categorizing module 129 begins the severity categorizing process by retrieving a list of computer assets that belong to computer network 131. For the purposes of this example, it is assumed that the assets belonging to computer network 131 include a computer and a wireless router. One skilled in the art will recognize that computer networks may comprise of any type and number of computer assets without departing from this invention.

In this example, it is assumed that the computer of computer network 131 has computing features such as a Windows operating system and it is configured to send/receive emails while the wireless router of computer network 131 has computing features such as a Windows operating system and is configured to send/receive SSH protocols. It should be noted that all computer assets will have various types of computing features, such as its operating system, network protocols that it's configured for, and so on, and are not limited to just these examples.

Module 129 will then select cluster 305 from TIF records 300. The first computer asset belonging to computer network 131 is then selected, which is the computer. Module 129 then selects the first computing feature of the computer which is its Windows operating system. This selected computing feature is then compared with information contained within data 225 of cluster 305 to determine whether this computing feature may be affected by the malicious activity that cluster 305 represents, i.e. 'worm attack'. As data 225 within cluster 305 indicates that cluster 305 affects Windows and Linux operating systems ("$d_{win}$ and $d_{linux}$"), module 129 will identify cluster 305 as a cluster than is severe to computer network 131. Module 129 then repeats this process for the other clusters, i.e. clusters 310 and 315 which are all identified as clusters severe to computer network 131 as data 225 of clusters 310, 315 indicate that these clusters have malicious activities that affect Windows operating systems ("$d_{win}$").

With regard to cluster 320, data 225 of this cluster indicates that this cluster's malicious activity affects Linux operating systems; point-to-point (PPP); and fax network protocols, i.e. "$d_{linux,PPP}$ and $d_{linux,fax}$"). As the computer of computer network 131 utilizes a Windows operating system and email network protocols, this computer asset of computer network 131 is not affected by this cluster. Module 129 then repeats the severity categorizing process for the other computer asset located in computer network 131, which is the wireless router. As the wireless router utilizes a Windows operating system and is configured to send/receive data using SSH network protocols, module 129 will indicate that this computer asset is also not affected by cluster 320. As all the computer assets in computer network 131 have computer features that are not affected by cluster 320, this cluster will be identified as a cluster that is not severe to computer network 131.

Hence, upon completion of the seventy categorizing process, only records relating to clusters 305, 310, and 315 are found to be severe to computer network 131. In other words, records from these three clusters are relevant to a computer analyst of computer network 131 while records from cluster 320 are not relevant. As such, the computer analyst need not spend time reviewing data contained within cluster 320 thereby shortening the analyst's review time and greatly improving the analyst's efficiency. After completing the severity categorizing process for computer network 131, module 129 then proceeds to carry out the severity categorizing process for the other computer networks, i.e. computer networks 132, 133 and 134. Database 128 is then updated accordingly with the results obtained from the severity categorizing of the computer networks.

In accordance with other embodiments of the invention, for each cluster, after the severity categorizing process, the severity categorizing process then further utilizes the severity weightage values of computer assets in the computer networks that are classified as severe to determine which computer network is more vulnerable to the computer security threat represented by that particular cluster.

For example, assume that computer network 131 and 134 both are affected by cluster 305. In this example, as cluster 305 affects a computer asset of computer network 131 that has been allocated a higher severity weightage value, the severity categorizing process will highlight this cluster to the analyst of computer network 131. In the same example, if the affected computer assets of computer network 134 were allocated a low severity weightage value, the analysts of computer network 134 would not be informed about this cluster until the other computer networks that have the higher severity weightage value have received the processed intelligence data.

With reference to FIG. 1, after the clustered TIF records have undergone severity categorization, the clustered TIF records are put through a vulnerability filtering process using vulnerability filtering module 126. In this process, clusters that are found to be severe for a particular computer network are compared to a security posture of the particular computer network to determine whether the computer network is vulnerable to the threats represented by the severe clusters.

In accordance with embodiments of the invention, a security posture of a computer network may be obtained by first creating an object model that represents all the cyber-security vulnerabilities of computer assets contained within the computer network. This object model is then put through a rigorous testing process to determine how vulnerable the computer network is to various types and forms of cyber-attacks. The testing process may involve executing an analysis program that cycles through, selects and executes a plurality of cyber-attacks on the object model to assess the vulnerability of the computer network to the various types and forms of cyber-attacks. During the testing process, each of the computer assets in the computer network is tested at a system level, a topological level and at a node level. If the object model is not affected by a particular attack, this would imply that the computer network is either effectively shielded against such an attack or an appropriate security patch has already been installed thereby rendering such an attack ineffective. This information is then utilized to generate a security posture of the computer network. If the object model is shown to be affected by a particular cyber-attack at a particular level, information about the cyber-attack is then captured and the security posture is updated accordingly.

By comparing clusters that are found to be severe for a particular computer network with the computer network's security posture, clusters that the computer network is already immune to will not be further processed for that computer network. This is because if the computer network has already been patched against a particular type of malicious activity, the security analyst of the computer network then need not receive similar information about the malicious activity as the related computer security threat would be of no harm to the computer network. As such, this further reduces the amount of irrelevant threat intelligence data that the security analyst has to sift through at their end. Database 128 is then updated accordingly with the results obtained from the vulnerability filtering of the computer networks.

Returning to the example described above whereby clusters 305, 310 and 315 were found to be clusters severe to computer network 131. If the security posture of computer network 131 is compared to clusters 305, 310, 315 and it is found that computer network 131 is only vulnerable to cluster 305, this would mean that records contained within clusters 310, 315 may be disregarded from further processing. In other words, the vulnerability testing of the security posture of computer network 131 shows that computer network 131 is vulnerable to 'worm' type attacks that affect Windows and Linux operating systems via email, SSH, and HTTP network protocols.

The final filtered clusters that are relevant to each computer network are then formatted according to each computer network's predefined format and are then provided to each computer network accordingly. For example, for computer network 133, it may be a prerequisite that a blacklist or a whitelist be applied to the clusters filtered for computer network 133 before the formatted records are provided to computer network 133. In other embodiments of the invention, a customized blindfold may be tailored and applied to the filtered clusters before this processed data is forwarded to third parties for their further use.

In accordance with embodiments of the invention, the formatted clusters may be utilized by the recipient computer networks to update the security postures of the respective computer networks. This will ensure that the security posture of the computer network remains up to date and as such, further reduces the amount of threat intelligence data that has to be reviewed by an analyst of the computer network.

In accordance with embodiments of the invention, after the normalised threat intelligence data are grouped into clusters by clustering module 128 and before the severity categorization process, the clustered data undergoes a validation process using validation module 124. As mentioned in the earlier part of the description, threat intelligence data obtained from certain sources tend to be more credible than threat intelligence data obtained from other sources. In particular, data obtained from commercial source 107 would have higher weightage than data obtained from open source 106, community source 108 and anonymous source 109. Through the use of the validation process, the clustered TIF records are validated to filter out records that are considered as "noise" or records that may be insignificant in nature. This may be done by applying a particular weightage to records in the clustered TIF records based on the source of the record and by validating clusters that have a total weightage above a predetermined threshold.

The proposed validation process is best explained with reference to the example shown in FIG. 3. In this example, records that originated from open source 106 are accorded with a weightage value of 1, records that originated from commercial source 107 are accorded with a weightage value of 5, records that originated from community source 108 are accorded with a weightage value of 1 and records that originated from anonymous source 109 are accorded with a weightage value of 1. When the weightage values are summed for each cluster, this result in the following weightage values: cluster 305 having a summed weightage of eight; cluster 310 having a summed weightage of six; cluster 315 having a summed weightage of three; and cluster 320 having a summed weightage of six. In this example, the predefined threshold is set as five as such; any clusters having a summed weightage less than five will not be validated and as such, will be considered as "noise". This is illustrated in FIG. 4 whereby TIF records 400 illustrate clusters 305, 310, 320 as having been validated and cluster 315 as having been omitted from further processing.

In accordance with embodiments of the invention, a method for consolidating threat intelligence data for a computer network comprises the following five steps:

Step 1, collecting threat intelligence data from a plurality of sources and normalising the collected threat intelligence data into a uniform data format;

Step 2, grouping normalised threat intelligence data into clusters, wherein each cluster comprises a group of data that represents an attribute of the threat intelligence data;

Step 3, categorizing the dusters for computer security threats severe to the computer network;

Step 4, comparing the dusters categorized as severe with a security posture of the computer network to determine clusters that are of interest to the computer system; and Step 5, formatting the clusters determined to be computer security threats of interest to the computer system to a predefined format of the computer network.

In embodiments of the invention, a process is needed for consolidating only relevant threat intelligence data from a plurality of sources for a target computer network. The following description and FIGS. 5-7 describe embodiments of processes that provide processes in accordance with this invention.

Figure 5:
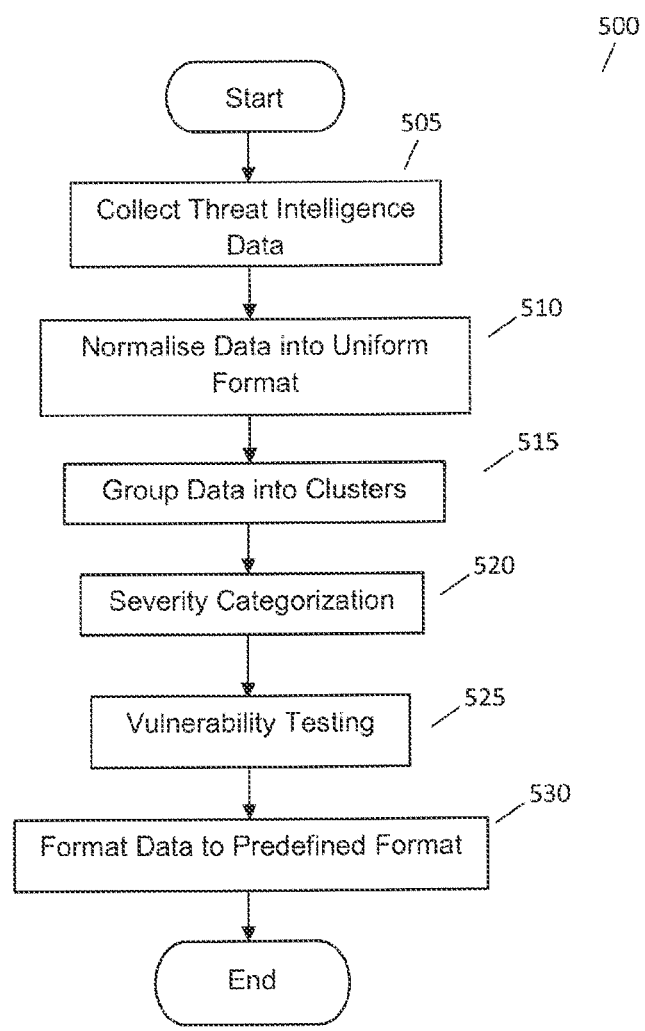
FIG. 5 illustrating a flow diagram of a process for aggregating and redistributing relevant threat intelligence data in an appropriate format in accordance with embodiments of the invention.

FIG. 5 illustrates process 500 that is performed by a computer system to consolidate threat intelligence data for a computer network in accordance with embodiments of this invention. Process 500 begins at step 505 whereby threat intelligence data is collected from a plurality of sources. This amalgamation of raw threat intelligence data comprises data that are in a variety of formats and configured for transmission using various network protocols. Process 500 then proceeds to step 510 whereby all the raw threat intelligence data are normalised into a uniform format. In embodiments of the invention, this uniform format may comprise TIF records. At step 515, data in the uniform format are grouped into clusters whereby each cluster represents an attribute of the threat intelligence data such as a type of malicious activity, IP address, location, origin, source, or computer security threat. Process 500 then proceeds to step 520 whereby the clustered data then undergoes a severity categorizing process to filter out dusters that are severe to the computer network. Clusters that are deemed severe to the computer network are then further subjected to a vulnerability filtering process at step 525. At this step, the severe clusters are compared with a security posture of the computer network to determine the clusters which the computer network is vulnerable to. The further filtered clusters are then formatted into a predefined format of the computer network at step 530. Process 500 then ends.

Figure 6:
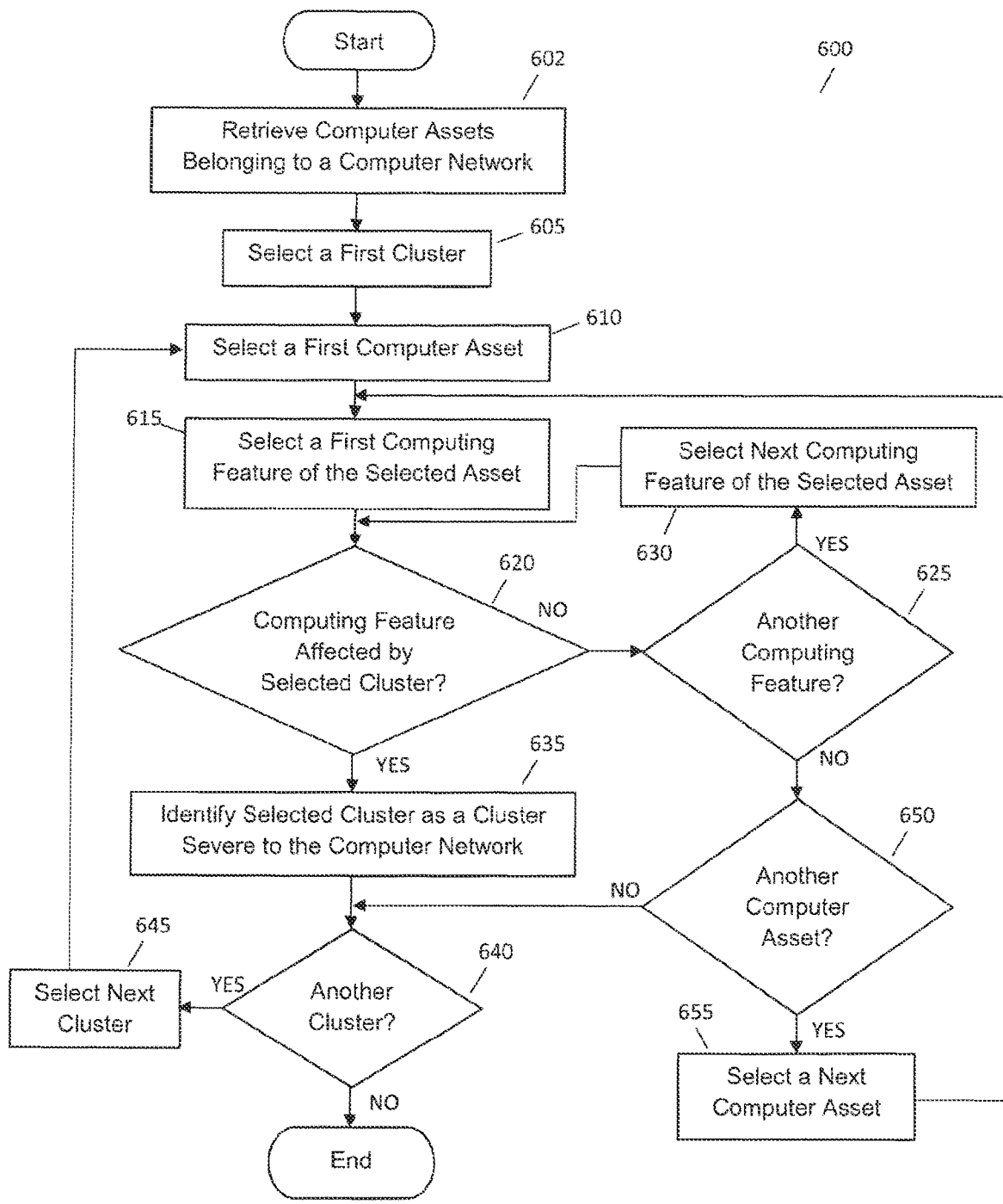
FIG. 6 illustrating a flow diagram of a process for executing a severity categorizing analysis on clustered data in accordance with embodiments of the invention.

FIG. 6 illustrates process 600 that is performed by a computer system to filter the clustered records for computer security threats or clusters that are severe to the computer network. Process 600 begins at step 602 by retrieving computer assets belonging to the computer network. Process 600 then selects a first cluster from the clustered records at step 605. At step 610, process 600 selects a first computer asset from the retrieved computer assets. Process 600 then proceeds to select a first computing feature associated with the selected computer asset. This takes place at step 615. The selected computing feature is compared with data in the selected cluster at step 620. If process 600 determines that the selected computing feature is not affected by the selected cluster, process 600 proceeds to step 625. At step 625, process 600 determines whether the selected computer asset as another computing feature that has yet to be selected. If there is another computing feature that is to be selected, process 600 proceeds to step 630. The next computing feature of the selected computer asset is selected at step 630 and process 600 then proceeds to step 620 whereby the selected computing feature is assessed at step 620.

Returning to step 625, if the selected computer asset's computing features have all been selected, process 600 then proceeds to step 650. At step 650, process 600 determines whether the computer network has another computer asset that has yet to be selected. If there is another computer asset to be selected, process 600 progresses to step 655 whereby another computer asset is selected. Process 600 then proceeds to step 615 whereby a first computing feature of the selected asset is selected and is subsequently assessed at step 620.

Returning to step 650, if all the computer assets of the computer network have been selected, process 600 proceeds to step 640 instead. At step 640, process 600 determines whether there another cluster in the clustered records that has yet to be assessed against the computer network. If there is another cluster, process 600 proceeds to select this next cluster at step 645. Process 600 then proceeds to step 610 whereby the first computer asset is selected. Process 600 then progresses through the respective steps as previously described.

Returning to step 620, if process 600 determines that the selected computing feature may be affected by the selected cluster, process 600 then proceeds to step 635 instead. At step 635, process 600 identifies the selected cluster as a cluster that is severe to the computer network and process 600 then proceeds to step 640 immediately without assessing other computing features of the computer asset.

Once all the clusters in the clustered records have been assessed by process 600, process 600 then ends.

Figure 7:
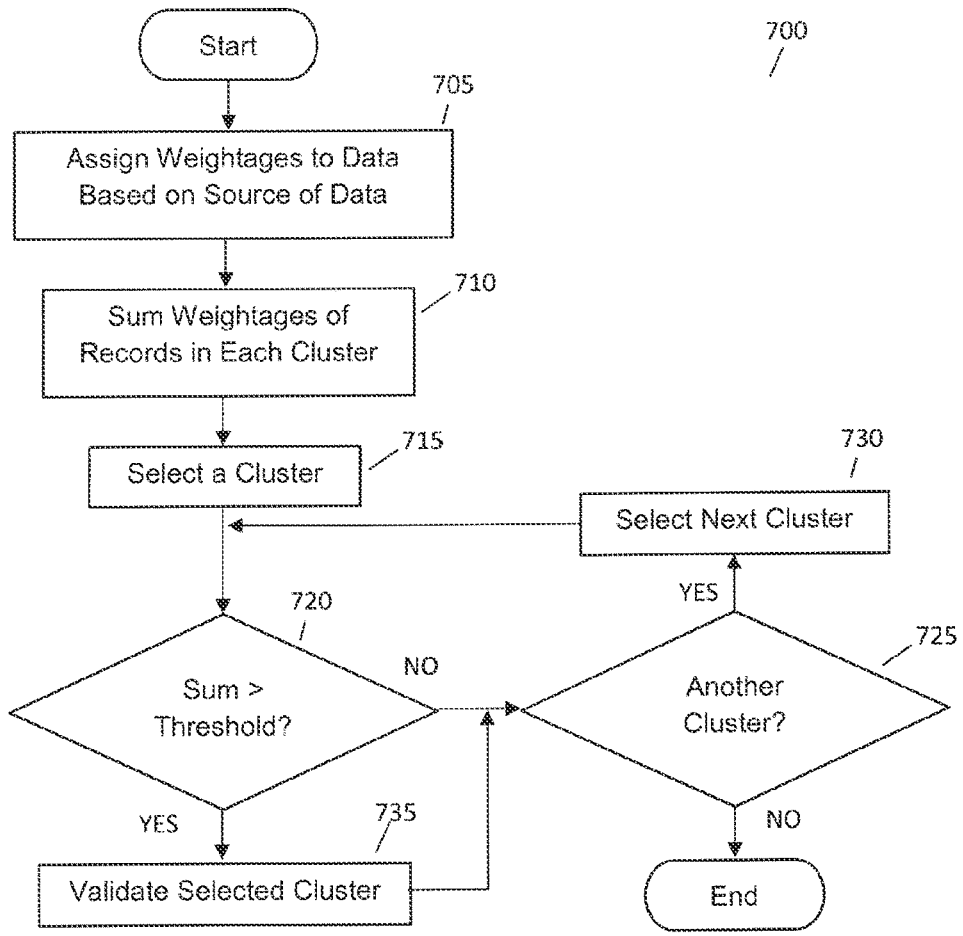
FIG. 7 illustrating a flow diagram of a process for validating clusters using threat intelligence data items of each cluster in accordance with embodiments of the invention.

FIG. 7 illustrates process 700 that is performed by a computer system to validate the clusters of the parsed and normalized threat intelligence data in accordance with embodiments of the invention. Process 700 begins at step 715 whereby appropriate weightages are assigned to each record depending the origin or source of the record. A higher weightage is assigned to data that originated from credible and reliable sources such as commercial sources while a lower weightage is assigned to data that originated from less credible sources such as open, community and anonymous sources. Process 700 then proceeds to step 710 whereby the weightages of the records in each cluster are all summed to obtain a total weightage for each cluster. At step 715, process 700 selects a cluster and determines at step 720 whether the summed weightage for the selected cluster exceeds a predefined threshold. If process 700 determines that the summed weightage of the selected clusters exceeds the predefine threshold, process 700 proceeds to step 735. At step 735, the selected cluster will be validated by process 700 and process 700 then proceeds to step 725.

Returning to step 720, if the summed weightage of the selected cluster does not exceed the predefined threshold process 700 will instead proceed to step 725. At step 725, process 700 will determine whether there is another cluster that is to be selected by process 700. If process 700 determines that there is another cluster, process 700 will proceed to step 730. At step 730, process 700 will select the next cluster and then proceed to step 720. Process 700 will repeat steps 720 to 725 until all the clusters have been selected. In other words, once it is determined at step 725 that there are no more clusters to be selected, process 700 then ends.

Figure 8:
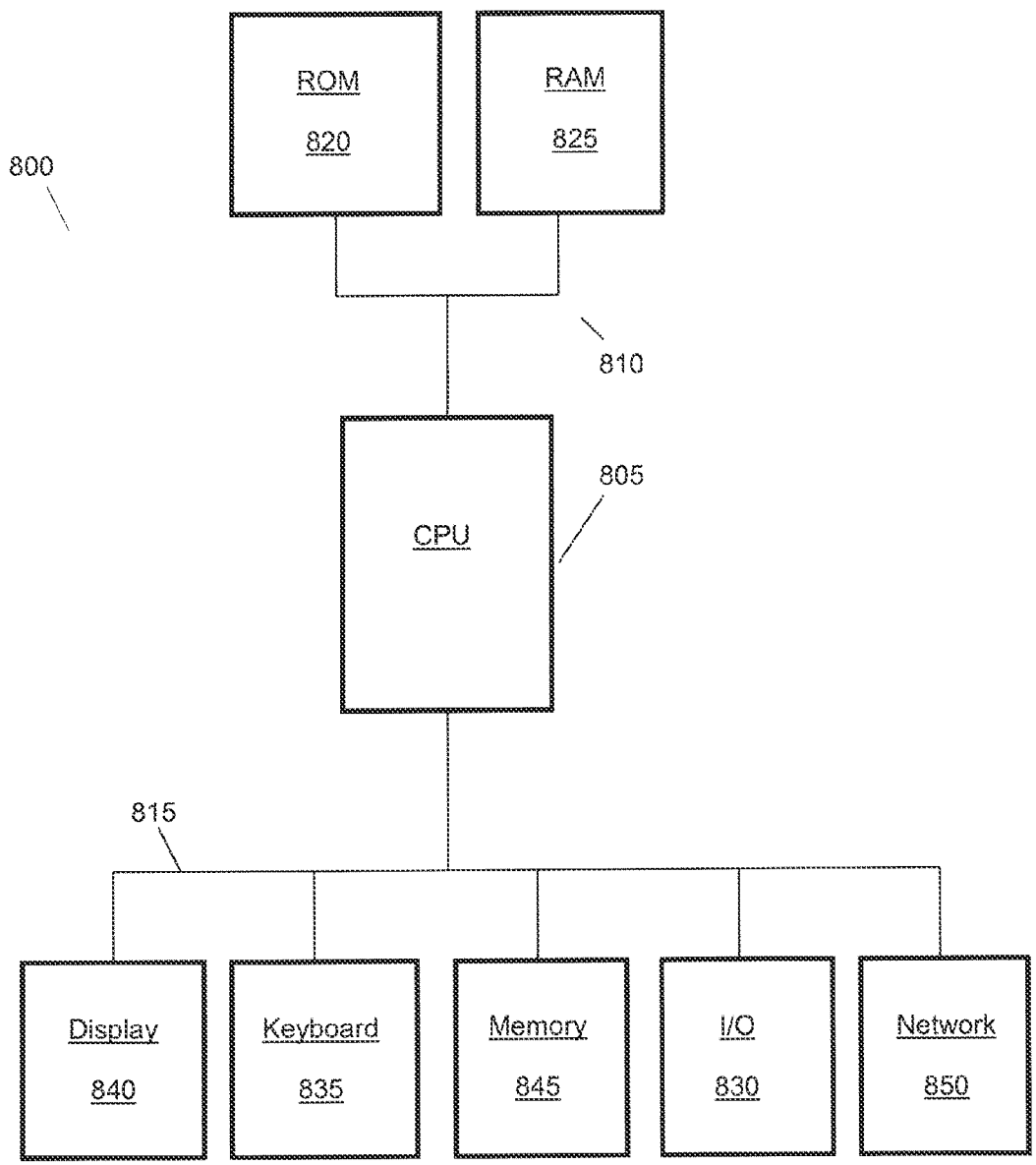
FIG. 8 illustrating a block diagram representative of processing systems providing embodiments in accordance with embodiments of the invention.

Processes described above may be provided by instructions stored in a non-transitory computer-readable media and are executed by a processing unit in a computer system. For the avoidance of doubt, non-transitory computer-readable media shall be taken to comprise all computer-readable media except for a transitory, propagating signal. A computer system may be provided in one or more mobile devices and/or computer servers to provide this invention. The instructions may be stored as firmware, hardware, or software. FIG. 8 illustrates an example of such a processing system. Processing system 800 may be the processing system in the mobile devices and/or servers that execute the instructions to perform the processes for providing a method and/or system in accordance with embodiments of this invention. One skilled in the art will recognize that the exact configuration of each processing system may be different and the exact configuration of the processing system in each mobile device may vary and FIG. 8 is given by way of example only.

Processing system 800 includes Central Processing Unit (CPU) 805. CPU 805 is a processor, microprocessor, or any combination of processors and microprocessors that execute instructions to perform the processes in accordance with the present invention. CPU 805 connects to memory bus 810 and Input/Output (I/O) bus 815. Memory bus 810 connects CPU 805 to memories 820 and 825 to transmit data and instructions between memories 820, 825 and CPU 805. I/O bus 815 connects CPU 805 to peripheral devices to transmit data between CPU 805 and the peripheral devices. One skilled in the art will recognize that I/O bus 815 and memory bus 810 may be combined into one bus or subdivided into many other busses and the exact configuration is left to those skilled in the art.

A non-volatile memory 820, such as a Read Only Memory (ROM), is connected to memory bus 810. Non-volatile memory 820 stores instructions and data needed to operate various sub-systems of processing system 800 and to boot the system at start-up. One skilled in the art will recognize that any number of types of memory may be used to perform this function.

A volatile memory 825, such as Random Access Memory (RAM), is also connected to memory bus 810. Volatile memory 825 stores the instructions and data needed by CPU 805 to perform software instructions for processes such as the processes required for providing a system in accordance with embodiments of this invention. One skilled in the art will recognize that any number of types of memory may be used as volatile memory and the exact type used is left as a design choice to those skilled in the art.

I/O device 830, keyboard 835, display 840, memory 845, network device 850 and any number of other peripheral devices connect to I/O bus 815 to exchange data with CPU 805 for use in applications being executed by CPU 805. I/O device 830 is any device that transmits and/or receives data from CPU 805. Keyboard 835 is a specific type of I/O that receives user input and transmits the input to CPU 805. Display 840 receives display data from CPU 805 and display images on a screen for a user to see. Memory 845 is a device that transmits and receives data to and from CPU 805 for storing data to a media. Network device 850 connects CPU 805 to a network for transmission of data to and from other processing systems.

The above is a description of embodiments of a system and process in accordance with the present invention as set forth in the following claims. It is envisioned that others may and will design alternatives that fall within the scope of the following claims.

The invention claimed is:

1. A method of consolidating threat intelligence data for a computer network, the method to be performed by a computer system comprising: collecting threat intelligence data from a plurality of sources and normalizing the collected threat intelligence data into a uniform data format; grouping normalized threat intelligence data into clusters using unsupervised machine learning algorithms, wherein each cluster comprises a group of data that represents an attribute of the threat intelligence data; categorizing clusters that are severe to the computer network; comparing the clusters categorized as severe with a security posture of the computer network to determine clusters that are of interest to the computer system; and formatting the clusters determined to be of interest to the computer system to a predefined format of the computer network; and wherein the categorizing the clusters that are severe to the computer network comprises: retrieving a list of computer assets associated with the computer network; identifying clusters that affect a computing feature of the computer assets; and classifying identified clusters that affect a computing feature of the computer asset as severe to the computer network.

2. The method according to claim 1 further comprising retrieving severity weightage values accorded to each of the computer assets associated with the computer network; summing the retrieved severity weightage values; and allocating the summed severity weightage value to the computer network.

3. The method according to claim 1 wherein the computing feature comprises an operating system or a network protocol of a computer asset.

4. The method according to claim 1, wherein before the comparing the clusters categorized as severe with a security posture of the computer network to determine clusters of interest to the computer system, the method further comprises: generating the security posture of the computer network.

5. The method according to claim 4 wherein the generating the security posture of the computer network comprises: creating an object model representing the computer network, wherein the object model includes computer security information of computer assets contained within the computer network; and executing an analysis program operative to run vulnerability testing of each of the computer assets in the computer network using the object model, wherein the results of the vulnerability testing are used to determine the security posture of the computer network.

6. The method according to claim 5, wherein the vulnerability testing of each of the computer assets in the computer network using the object model comprises tests pertaining to system level and topology vulnerabilities of the computer network, and node level vulnerabilities of the computer assets.

7. The method according to claim 1 wherein the grouping normalised threat intelligence data into clusters machine learning algorithms, wherein each cluster comprises a group of data that represents an attribute of the threat intelligence data further comprises: validating the clusters using threat intelligence data in each cluster.

8. The method according to claim 7 wherein the validating the clusters comprises: assigning weightage values to each record contained in the clusters, wherein a record originating from an open source is assigned a lower weightage value as compared to a weightage value assigned to a record originating from a commercial source; summing the weightage values of records contained in each cluster; and validating clusters that have summed weightage values that exceed a predefined threshold.

9. The method according to claim 1 further comprising: using the formatted clusters to update the security posture of the computer network.

10. The method according to claim 1 wherein the attribute of the threat intelligence data comprises a computer security threat or an Internet Protocol (IP) address.

11. A system for consolidating threat intelligence data for a computer network comprising: a processing unit; and a non-transitory media readable by the processing unit, the media storing instructions that when executed by the processing unit, cause the processing unit to; collect threat intelligence data from a plurality of sources and normalize the collected threat intelligence data into a uniform data format; group normalized threat intelligence data into clusters using unsupervised machine learning algorithms, wherein each cluster comprises a group of data that represents an attribute of the threat intelligence data; categorize dusters that are severe to the computer network; compare the clusters categorized as severe with a security posture of the computer network to determine clusters that are of interest to the computer system; and format the clusters determined to be of interest to the computer system to a predefined format of the computer network; and wherein the instructions to categorize the clusters that are severe to the computer network comprises: instructions for directing the processing unit to: retrieve a list of computer assets associated with the computer network; identify dusters that affect a computing feature of the computer assets; and classify identified clusters that affect a computing feature of the computer asset as severe to the computer network.

12. The system according to claim 11 further comprising: instructions for directing the processing unit to: retrieve severity weightage values accorded to each of the computer assets associated with the computer network; sum the retrieved severity weightage values; and allocate the summed severity weightage value to the computer network.

13. The system according to claim 11 wherein the computing feature comprises an operating system or a network protocol of a computer asset.

14. The system according to claim 11, wherein before the instructions to compare the clusters categorized as severe with a security posture of the computer network to determine clusters of interest to the computer system, the system further comprises: instructions for directing the processing unit to: generate the security posture of the computer network.

15. The system according to claim 14 wherein the instructions to generate the security posture of the computer network comprises: instructions for directing the processing unit to: create an object model representing the computer network, wherein the object model includes computer security information of computer assets contained within the computer network; and execute an analysis program operative to run vulnerability testing of each of the computer assets in the computer network using the object model, wherein the results of the vulnerability testing are used to determine the security posture of the computer network.

16. The system according to claim 15, wherein the vulnerability testing of each of the computer assets in the computer network using the object model comprises tests pertaining to system level and topology vulnerabilities of the computer network, and node level vulnerabilities of the computer assets.

17. The system according to claim 11 wherein the instructions to group normalised threat intelligence data into clusters machine learning algorithms, wherein each cluster comprises a group of data that represents an attribute of the threat intelligence data further comprises: instructions for directing the processing unit to: validate the clusters using threat intelligence data in each cluster.

18. The system according to claim 17 wherein the instructions to validate the clusters comprises: instructions for directing the processing unit to: assign weightage values to each record contained in the clusters, wherein a record originating from an open source is assigned a lower weightage value as compared to a weightage value assigned to a record originating from a commercial source; sum the weightage values of records contained in each cluster; and validate clusters that have summed weightage values that exceed a predefined threshold.

19. The system according to claim 11 further comprising: instructions for directing the processing unit to: use the formatted clusters to update the security posture of the computer network.

20. The system according to claim 11 wherein the attribute of the threat intelligence data comprises a computer security threat or an Internet Protocol (IP) address.

21. A system for consolidating threat intelligence data for a computer network comprising: circuitry configured to collect threat intelligence data from a plurality of sources and normalize the collected threat intelligence data into a uniform data format; circuitry configured to group normalized threat intelligence data into clusters using unsupervised machine learning algorithms, wherein each cluster comprises a group of data that represents an attribute of the threat intelligence data; circuitry configured to categorize clusters that are severe to the computer network; circuitry configured to compare the clusters categorized as severe with a security posture of the computer network to determine clusters that are of interest to the computer system; and circuitry configured to format the clusters determined to be of interest to the computer system to a predefined format of the computer network; and wherein the circuitry configured to categorize the clusters that are severe to the computer network comprises: circuitry configured to retrieve a list of computer assets associated with the computer network; circuitry configured to identify clusters that affect a computing feature of the computer assets; and circuitry configured to classify identified clusters that affect a computing feature of the computer asset as severe to the computer network.

22. The system according to claim 21 further comprising: circuitry configured to retrieve severity weightage values accorded to each of the computer assets associated with the computer network; circuitry configured to sum the retrieved severity weightage values; and circuitry configured to allocate the summed severity weightage value to the computer network.

23. The system according to claim 21 wherein the computing feature comprises an operating system or a network protocol of a computer asset.

24. The system according to claim 21, wherein before the circuitry configured to compare the clusters categorized as severe with a security posture of the computer network to determine clusters of interest to the computer system, the system further comprises: circuitry configured to generate the security posture of the computer network.

25. The system according to claim 24 wherein the circuitry configured to generate the security posture of the computer network comprises: circuitry configured to create an object model representing the computer network, wherein the object model includes computer security information of computer assets contained within the computer network; and circuitry configured to execute an analysis program operative to run vulnerability testing of each of the computer assets in the computer network using the object model, wherein the results of the vulnerability testing are used to determine the security posture of the computer network.

26. The system according to claim 25, wherein the vulnerability testing of each of the computer assets in the computer network using the object model comprises tests pertaining to system level and topology vulnerabilities of the computer network, and node level vulnerabilities of the computer assets.

27. The system according to claim 21 wherein the circuitry configured to group normalized threat intelligence data into clusters machine learning algorithms, wherein each cluster comprises a group of data that represents an attribute of the threat intelligence data further comprises: circuitry configured to validate the clusters using threat intelligence data in each cluster.

28. The system according to claim 27 wherein the circuitry configured to validate the clusters comprises: circuitry configured to assign weightage values to each record contained in the clusters, wherein a record originating from an open source is assigned a lower weightage value as compared to a weightage value assigned to a record originating from a commercial source; circuitry configured to sum the weightage values of records contained in each cluster; and circuitry configured to validate clusters that have summed weightage values that exceed a predefined threshold.

29. The system according to claim 21 further comprising: circuitry configured to use the formatted clusters to update the security posture of the computer network.

30. The system according to claim 21 wherein the attribute of the threat intelligence data comprises a computer security threat or an Internet Protocol (IP) address.

\* \* \* \* \*